United States Patent
Fernandez

[11] Patent Number: 6,067,942
[45] Date of Patent: May 30, 2000

[54] FISH LASSO

[76] Inventor: John Bernard Fernandez, 56 N. Suffolk Dr., Rock Point, N.Y. 11778

[21] Appl. No.: 09/082,666

[22] Filed: May 21, 1998

[51] Int. Cl.⁷ .................................................. A01K 74/00
[52] U.S. Cl. ............................ 119/802; 119/804; 119/805
[58] Field of Search ................................... 119/802, 803, 119/805, 780, 786

[56] References Cited

U.S. PATENT DOCUMENTS

| | | |
|---|---|---|
| 1,227,794 | 5/1917 | Johnson . |
| 1,759,054 | 5/1930 | Laub . |
| 2,522,533 | 9/1950 | Nankeman . |
| 3,765,119 | 10/1973 | Hare et al. ................................... 43/87 |
| 3,841,685 | 10/1974 | Kolodziej ............................... 294/19.1 |
| 3,872,834 | 3/1975 | Fuhrman .................................. 119/801 |
| 4,103,953 | 8/1978 | Lachance .................................. 294/1.4 |
| 4,216,607 | 8/1980 | Lyster ........................................... 43/87 |
| 4,261,280 | 4/1981 | Collic, Sr. ............................. 114/221 R |
| 4,596,530 | 6/1986 | McGlinn ..................................... 441/80 |
| 4,852,924 | 8/1989 | Ines ......................................... 2934/1.5 |
| 5,340,120 | 8/1994 | Holyoak .................................. 273/447 |
| 5,752,731 | 5/1998 | Crone ......................................... 294/24 |
| 5,778,826 | 7/1998 | Dillon et al. ............................. 119/717 |

*Primary Examiner*—Jack W. Lavinder
*Assistant Examiner*—Yvonne R. Abbott
*Attorney, Agent, or Firm*—Graham & James LLP

[57] ABSTRACT

The present invention relates to a device for capturing an aquatic animal such as a fish. The device is particularly useful for ensnaring the tail or the body of a fish. More particularly, the invention relates to a device which places a rope around the body or tail of any fish. The device comprises a pole having a circular tube attached at one end of the pole. A rope is removably attached to the inside of the tube such that when the rope is pulled on it is removed from the attachments of the tube and ensnares the body or tail of the fish. The rope has an open end on one end and a noose at the other end.

5 Claims, 1 Drawing Sheet

FISH LASSO

BACKGROUND OF THE INVENTION

1. Field of the Invention

The present invention relates to a device for capturing an aquatic animal such as a fish. The device is particularly useful for ensnaring the tail or the body of a fish. More particularly, the invention relates to a device which places a rope around the body or tail of any fish.

2. Description of the Prior Art

Once a fish is caught and brought alongside a boat or dock, the fish must be secured so that it can be brought on board. The conventional method of securing and landing a fish is to use a gaff which punctures and embeds itself in the fish so that the fish can be lifted out of the water by means of the gaff. Although the gaff can assist in lifting the fish out of the water, it causes substantial damage to the fish body.

U.S. Pat. No. 5,704,156 discloses a device for retrieving a fish hooked to a fishing line comprising : a gripping mechanism for gripping the fish, a guide mechanism connected to the gripping mechanism for guiding the device along the line, and a retrieval mechanism operatively connected to the gripping mechanism for retrieving the device and the fish. More specifically, the invention relates to a tethered device which slides down a length of fishing line to engage, ensnare, and raise to boat level a fish which has been caught. This object of this patent resides in overcoming the problem of raising a dead or dying fish from within the water.

U.S. Pat. Nos. 5,174,057 and 5,058,306 disclose a fish roping device comprising a U-shaped spring member with two arms and a rigid handle connected to the base section of the U-shaped spring member. Two arcuate members are connected together at one end by a hinge and are further attached, near the hinged ends, to the outer arms of the U-shaped spring member. The arcuate members are attached to the spring member so as to be movable between an open and a closed position. In the open position, the two arcuate members form an approximately U-shape. When a blow is directed against the hinge connecting the arcuate members, the arms of the U-shaped spring member return to a less tensioned position and cause the arcuate members to pivot together to form a closed, roughly circular configuration. The ends of the arcuate members are provided with a ring and a hook. A rope is fastened at one end to the hook. When the arcuate members are in the open position, the rope forms a triangle. When the operator desires to rope the tail end of the fish, he strikes the tail end of the fish with the device in the area of the hinge between the arcuate members. This method invariably causes sustained damage or trauma to the fish.

U.S. Pat. No. 4,635,986 disclose a device for holding and manipulating an end loop of a boat line at an extended distance from the user, especially for positioning the loop over a cleat or the top of a piling to dock a boat. The device attaches to a long pole such as a boat hook. The device may be adapted for applying a tail rope to a large fish, or an animal that might be dangerous to handle at close quarters. When the device is employed to apply a snare such as a tail rope on a fish, the loop is formed with a sliding knot that can be pulled up snug after fitting it over the tail.

In view of the above, it is reasonable to assume that prior art attempts at capturing fish with minimum damage or trauma have been unsuccessful.

SUMMARY OF THE INVENTION

The device comprises a pole having a circular tube attached at one end of the pole. A rope is removably attached to the inside of the tube such that when the rope is pulled on it is removed from the attachments of the tube. The rope has an open end on one end and a noose at the other end. Preferably, the noose of the rope is placed at the connection between the tube and the pole.

In order to ensnare the tail of an aquatic animal the tube is placed over the tail of the animal. The open end of the rope is placed within the noose of the rope. The open end of the rope is then pulled tightly through the noose discharging the rope from the tube. The rope is then tightened around the tail or body of the animal allowing the operator to bring the animal aboard.

It is an object of the present invention to provide an apparatus for securing an aquatic animal preferably a fish without puncturing it's body.

It is desirable for the elements making up the device to be formed of a material which is resistant to water. The rope is preferably made of nylon so as to also be resistant to water.

It is a further object of the invention to provide a pole that is telescopic so that the device can easily be stored when not in use.

It is a further object of the invention to provide tubes of multiple diameters that can be easily attached and removed from the pole.

These and other advantages, features and elements of the preferred embodiments of the present invention will become more apparent from the drawings and description appended hereto.

BRIEF DESCRIPTION OF THE DRAWING FIGURES

FIG. 1 discloses an embodiment of the present invention.

FIG. 2 discloses a tail noose rope of the present invention.

FIG. 3 discloses a retainer clip of the present invention.

DESCRIPTION OF PREFERRED EMBODIMENTS

Figure 1:
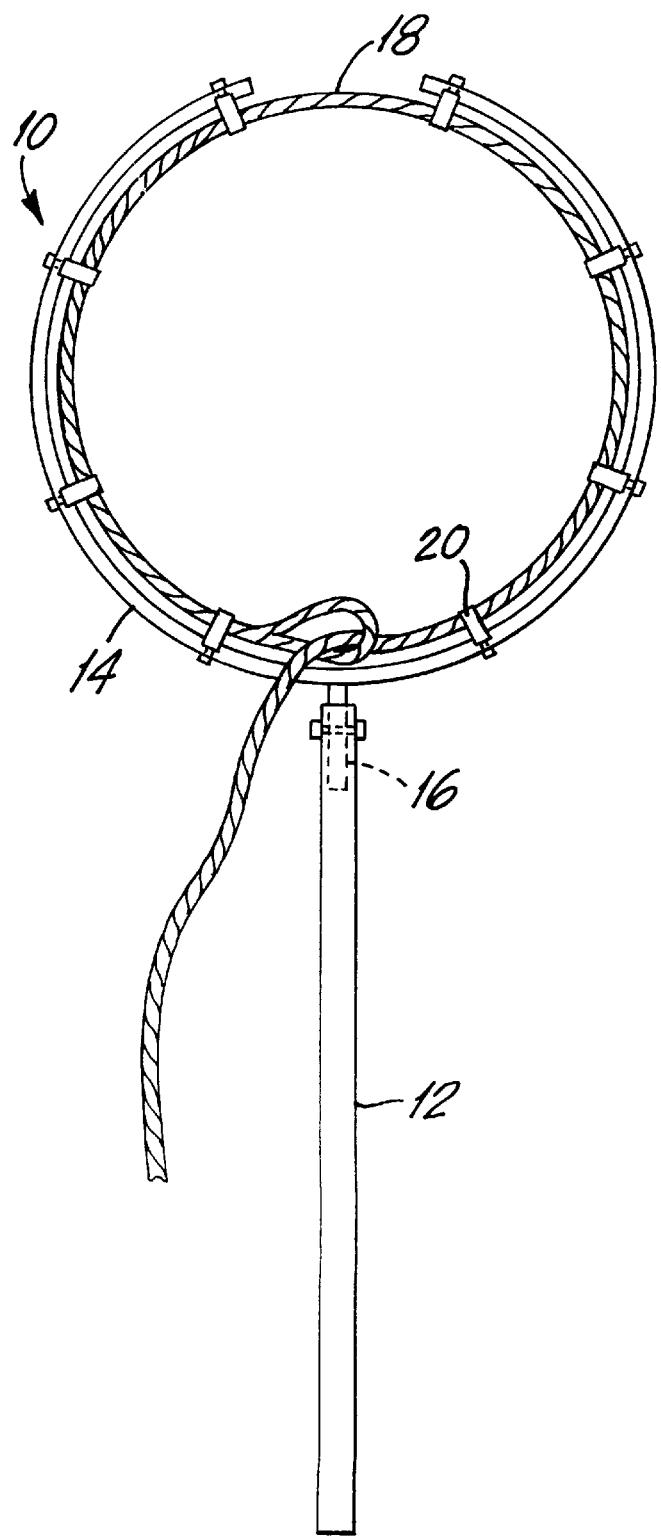

FIG. 1 discloses a preferred embodiment, illustrating the fish noose 10. The fish noose 10 is made up of pole 12. Pole 12 can be made of numerous materials including, aluminum or other sheet metals, plastics, etc. However, when trying to catch large fish, a sturdier material is preferred, preferably aluminum. The pole 12 can be telescopic, so that it can vary in length.

Pole 12 is attached to a circular tubing 14 by means of attachment 16. Attachment 16 keeps pole 12 attached to tube 14 by fastener 16. Fastener 16 can be bolts, screws or any other means known in the art. Tube 14 is preferably made of stainless steel, however any non corrosive metal is preferred. The diameter of tube 14 is preferably between ½" to 1" and most preferred ½".

The diameter of circle created by the tube 14 is approximately about 30" so that the device can be used with most sizes of fish. However, the tube 14 can be manufactured to produce any diameter circle.

A rope 18 is secured to tube 14 by means of a retainer clip 20. In a preferred embodiment, rope 18 is approximately 10 feet to approximately 20 feet in length. The rope is preferably made of a water resistant material, possibly nylon.

Figure 2:
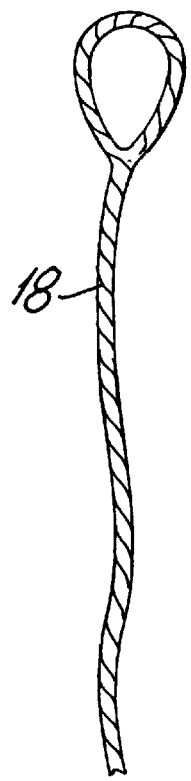

The rope 18 is shown in FIG. 2 with a loop 28 on one end of the rope 18 and an open end 26 at the other end of the rope 18. As seen in FIG. 1 the rope 18 is placed within each of the rope retainer clip opening 24. The number of rope retainer clips 24 depends on the size of the tube 14. The loop 28 of the rope 18 is placed toward the pole 12. The open end 26 of the rope 18 is placed within the loop 28 of the rope 18.

Figure 3:
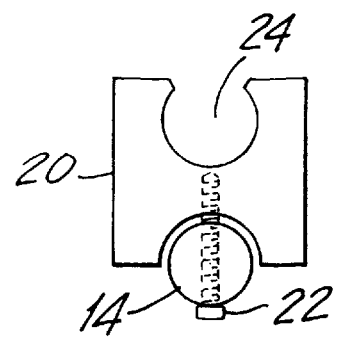

The rope retainer clip 20 as shown in FIG. 3 can be made of plastic, metal or any material known in the industry. The rope retainer clip 20 is attached to tube 14 by means of a fastener 22. The fastener 22 can be a screw or other device that can fix the retainer clip 20 to the circular tube 14. The rope 18 is placed in the retainer clip 20 within opening 24. Retainer clip 20 can have different size openings 24 so that it can fit any size of rope 18.

When a fish is caught on a line, the user places the device 10 over the tail of the fish. Specifically, the opening in the tube 14 is placed around the tail of the fish. Then the user pulls on the open end 26 of the rope 18. This pulls the rope 18 out of the rope retainer clip 20. The open end 26 of the rope 18 is placed through the loop 28 in rope 18 so that the fishes' tail is ensnared in the rope 18.

What is claimed is:

1. A device for ensnaring a tail or body of a fish comprising a pole having a circular tube attached at one end; a rope with a noose at one end and an open end at the other end of said rope; said rope being removably attached to the inside of said tube; when said rope is pulled at an opened end, said rope is pulled away from said tube; said open end of said rope is then pulled within said noose of said rope ensnaring said tail of said fish;

said rope being attached to said tube by a number of retainer clips equally spaced around said tube;

said rope made of a water resistant material said retainer clip having an adjustable opening so as to fit different sizes of said rope.

2. The device of claim 1 wherein said pole is made telescopic.

3. The device of claim 1 wherein said tube can be easily removed from said pole.

4. The device of claim 1 wherein said tube has a diameter of between about ½" to about 1".

5. The device of claim 1 wherein said circular tube has a diameter of about 30".

\* \* \* \* \*